Jan. 28, 1964   V. R. CARPENTER   3,119,519
CUP DISPENSING MECHANISM
Filed Dec. 15, 1961   3 Sheets-Sheet 1

INVENTOR.
Virgil R. Carpenter
BY
Lieber, Lieber & Nilles
Attorneys

Jan. 28, 1964　　　V. R. CARPENTER　　　3,119,519
CUP DISPENSING MECHANISM

Filed Dec. 15, 1961　　　　　　　　　　　　3 Sheets-Sheet 2

INVENTOR.
Virgil R. Carpenter
BY
Lieber, Lieber & Nilles
Attorneys

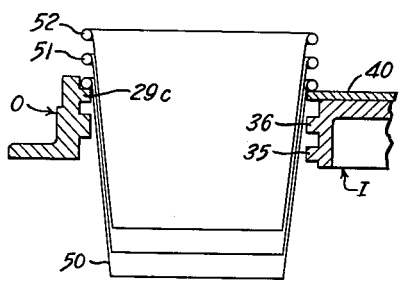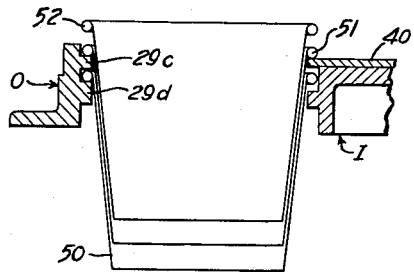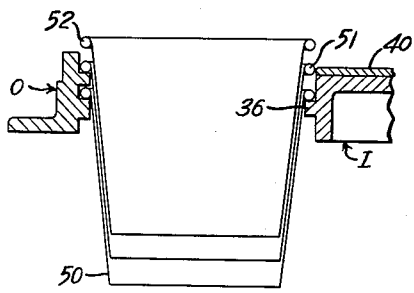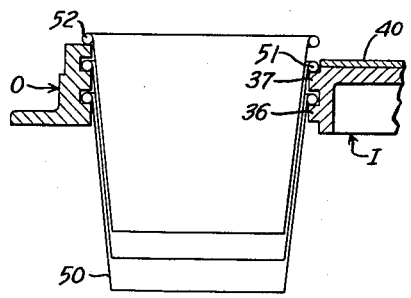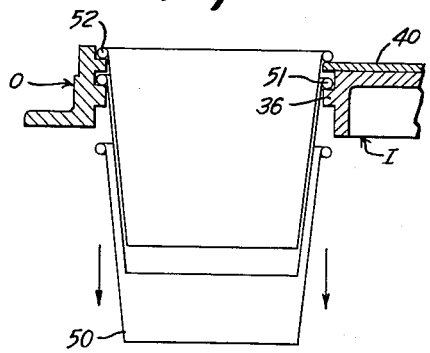

United States Patent Office 3,119,519
Patented Jan. 28, 1964

3,119,519
CUP DISPENSING MECHANISM
Virgil R. Carpenter, St. Paul, Minn., assignor to International Vending Machines, Inc., a corporation of Wisconsin
Filed Dec. 15, 1961, Ser. No. 159,508
8 Claims. (Cl. 221—113)

This invention relates to a mechanism for dispensing individual cups or the like, one at a time.

Prior art devices have utilized various means for ejecting the cups one at a time, some of which used a small gear on each side of the cups to be dropped to the discharge position. These devices have not proven to be entirely satisfactory, however, for various reasons. One of the shortcomings of these prior structures was that an entire stack of cups had to be dropped to a preliminary station, and this not only often caused damage to the beaded rim of the cup, but also required a considerably larger overall height for the mechanism.

Devices of the type to which the present invention relates are often used as a component part in a coin-operated, automatic machine for dispensing popcorn, drinks, or other commodities. As there are many other component parts in such a machine, it is of primary concern to keep the size of such components down to a minimum to thereby hold the overall size of the automatic dispensing machine to as small a unit as possible.

Accordingly, the present invention provides an improved cup dispensing mechanism which is one cup length shorter in height than conventional automatic dispensing mechanisms and in which an entire stack of cups is dropped into a pre-discharge position.

More specifically, the invention relates to a mechanism of the above type and which utilizes a large, internally threaded, stationary outer ring and a smaller, externally threaded, and revolvable inner ring located concentrically within the outer ring. A plurality of stacks of cups to be dispensed are located circumferentially around the annular path formed between the rings. Means are also provided for permitting the lowermost cups in the stacks to successively enter between the threads and be held by their beaded rims on and between the threads. As the inner ring rotates, the cups are rotated bodily in the annular path between the rings and are also rotated about their own individual axes. Thereby, a rolling contact is provided between the rings and the cups, and the construction and timing of the threads are such as to cause one stack at a time to be gradually and only slightly lowered, and the lowermost cup in that stack simultaneously separated and thereby loosened from the remainder of the stack.

The arrangement of the present dispensing mechanism is such that the stacks of cups are always positively held in a vertical position and cannot tilt to cause malfunctioning of the machine. The stacks are never jarred or dropped on the rim of any cup and are rotated with a rolling contact with both gears. The stacks are bodily rotated above the annular path between the gears and are successively lowered, at one point of their travel around the path, only by an amount equal to the spacing between adjacent cups in the nested stack. During this gradually lowering movement of the stack, the lowermost cup in that stack is also caused to be separated from the rest of the stack, thereby breaking the vacuum which helps to hold this lowermost cup on its stack. The lowermost cups in their stacks are thus successively separated and free to fall by gravity from the mechanism.

These and other objects and advantages of the present invention will appear hereinafter as this disclosure progresses, reference being had to the accompanying drawings, in which:

FIGURE 3 is a plan view of the inner ring assembly shown in FIGURE 1;

FIGURE 4 is an elevational view of the inner ring assembly;

Figure 1:
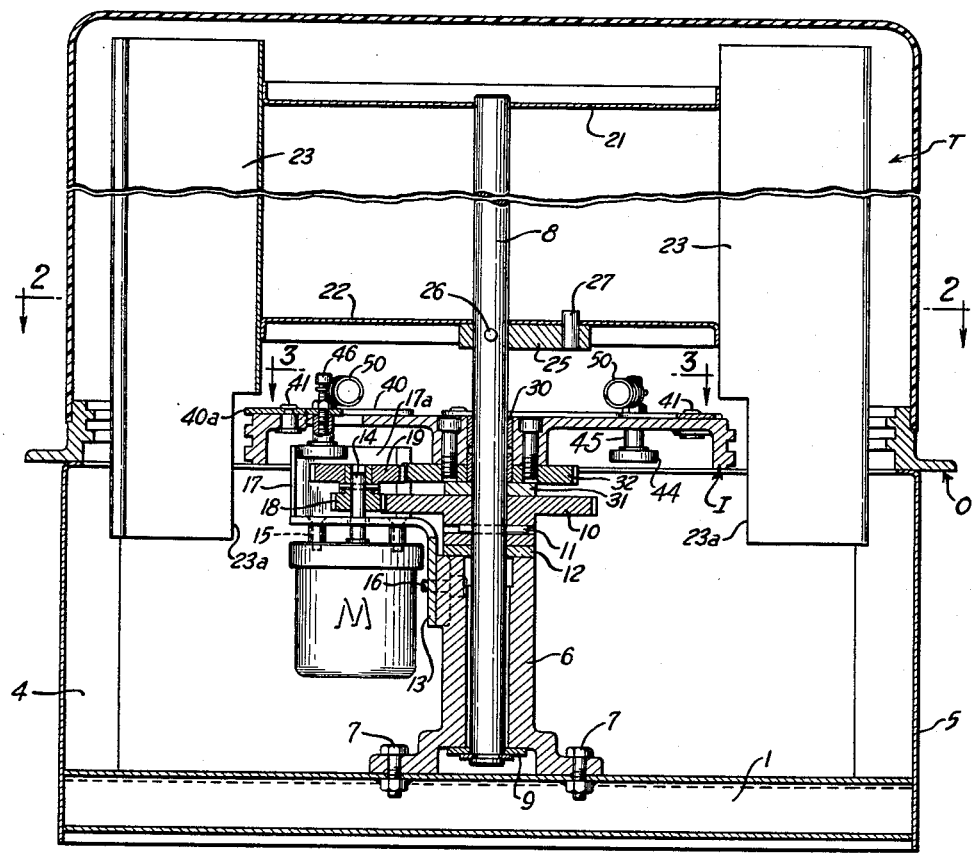
FIGURE 1 is a vertical, sectional view of a mechanism made in accordance with the present invention, certain parts being shown as broken away or removed for the sake of clarity.

Referring in greater detail to the drawings, a generally rectangular base 1 is fabricated from sheet metal and has four corner posts 2, 3, 4, and 5 rigidly secured thereto as by welding.

A centrally located and vertically disposed bearing 6 is secured by bolt means 7 extending through its lower flange to the base. A vertical drive shaft 8 is rotatably mounted in this bearing and extends well above the corner posts. The shaft is held vertically in the bearing between the lower snap ring 9 and a large gear 10 fixed to the shaft by the cross pin 11. A large washer 12 facilitates rotation between the gear 10 and bearing 6, and the weight of the major portion of the mechanism to be described is supported by the bearing 6 through washer 12.

An electric motor M is rigidly secured to the bearing 6 through the bracket 13. More specifically, the motor is disposed with its shaft 14 in the vertical position and is secured to the bracket by screws 15. The bracket in turn is secured to the bearing by bolt means 16 and has a cam 17 secured thereto, as by welding. The cam is fabricated from sheet steel and has a curved portion 17a which extends radially outwardly.

Secured to the motor shaft 14 are a smaller gear 18 and a larger gear 19. Gear 18 is in constant mesh with gear 10 thereby causing the shaft 8 and a cup magazine turret T to be rotated by the motor.

Cup Turret

Means are provided for insuring that the stacks of cups are initially properly positioned relative to the gears O and I (to be described), and this means also serves to insure that the stacks do not get out of phase with the gears. This means takes the form of a compartmented turret T comprising a pair of vertically spaced apart discs 21 and 22 which are adapted to slip downwardly over the shaft 8 and which have a series of fins 23 extending radially from and welded around their periphery. A lower portion of the fins is cut away as at 23a and extends downwardly between the gears O and I.

The fins do not serve to push the stacks of cups, but only come into engagement with them on occasion to keep them in a proper circumferential position relative to the gears on which they rest and by means of which they are actually rotated, as will appear.

In other words, after several revolutions of the mechanism, some of the stacks may creep ahead or fall behind slightly, due to any one of a number of reasons, and the fins may then urge or hold the stacks in their proper location. However, as previously mentioned, the primary purpose of the turret is to be sure that the stacks are properly loaded into the mechanism initially.

A lug 25 is secured by pin 26 to the drive shaft 8, and a drive pin 27 projects from the lug to provide an easily disengageable driving connection with the turret. Thus, the turret is simply slipped down on the shaft 8, and the disc 22 engages pin 27 to permit the turret to be driven by the motor. This drive pin connection permits assembly of the turret on the shaft in only one position and insures proper positioning of the stacks of cups relative to the threads on gears O and I, and the turret is driven at a different speed than the inner gear, as will appear.

*Outer Ring O*

Figure 5:
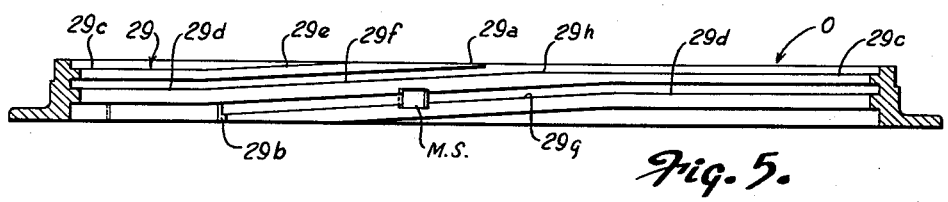
FIGURE 5 is a vertical, sectional view of the outer ring, taken along line 5—5 in FIGURE 2, and FIGURES 6 to 10 inclusive are enlarged, fragmentary, vertical sectional views through the gears and showing cups in various stages of their travel between the gears; these views are taken generally along their correspondingly numbered cross section lines in FIGURE 2.

The outer ring O is stationary and is fixed to the corner posts by the bolt means 28. This outer ring has a single internal thread 29 which begins at 29a and ends at 29b (FIGURE 5). Thread 29 makes just slightly more than two revolutions or portions 29c and 29d around the inner surface of the gear. Thread portion 29c is the upper portion, and portion 29d is the lower portion. Both of these portions are horizontal or level for the major part of their circumferential length. This straight portion assists in keeping the stacks in a vertical position. The remainder of length of the threads such as portions 29e, 29f, and 29g are inclined or of a helix shape, as shown in FIGURE 5, and the cups descend during their travel over these inclined portions. The stacks are kept in a vertical position during this lowering movement also. It should be noted that portion 29c is of less height than portion 29d. In other words, the lower part of thread 29 is of greater height than the initial part beginning at about point 29h. Furthermore, this lower portion 29d is of a height which is greater than the normal spacing between the nested cups. Stated otherwise, the normal spacing between the rims of a certain size of cups may be about three-eighths of an inch, for example, and for use with this type of cups the lower thread would be about one-half inch in height.

*Inner Ring I*

The inner ring I is rotatably mounted on the shaft 8 on a sleeve bearing 30 and rests on a washer 31. This ring is rotated through its attached gear element 32 and from the motor gear 19 in constant mesh therewith.

The ratio between the pairs of gears 18—10 and 19—32 is such that the inner ring rotates one-fourth of a revolution for every one-eleventh revolution of the turret, that is, the inner ring turns one-fourth revolution for each cup dispensed.

Around the periphery of the inner ring are formed four flights of threads 34, 35, 36, and 37, and the rims of the cups to be dispensed are adapted to rest on the upper side of these threads, as will presently be described in detail.

These flights cooperate successively and one at a time with the threads of the outer ring. It will be noted, by referring to FIGURE 4, that each flight has a horizontal, initial or cup-starting portion 34a, 35a, 36a, and 37a, respectively, on which a cup rests initially upon contacting the inner gear. A space, for example as indicated by reference letter B, exists between these horizontal portions, and a space C exists between the discharge ends 34b to 37b, respectively, of these threads.

Figure 2:
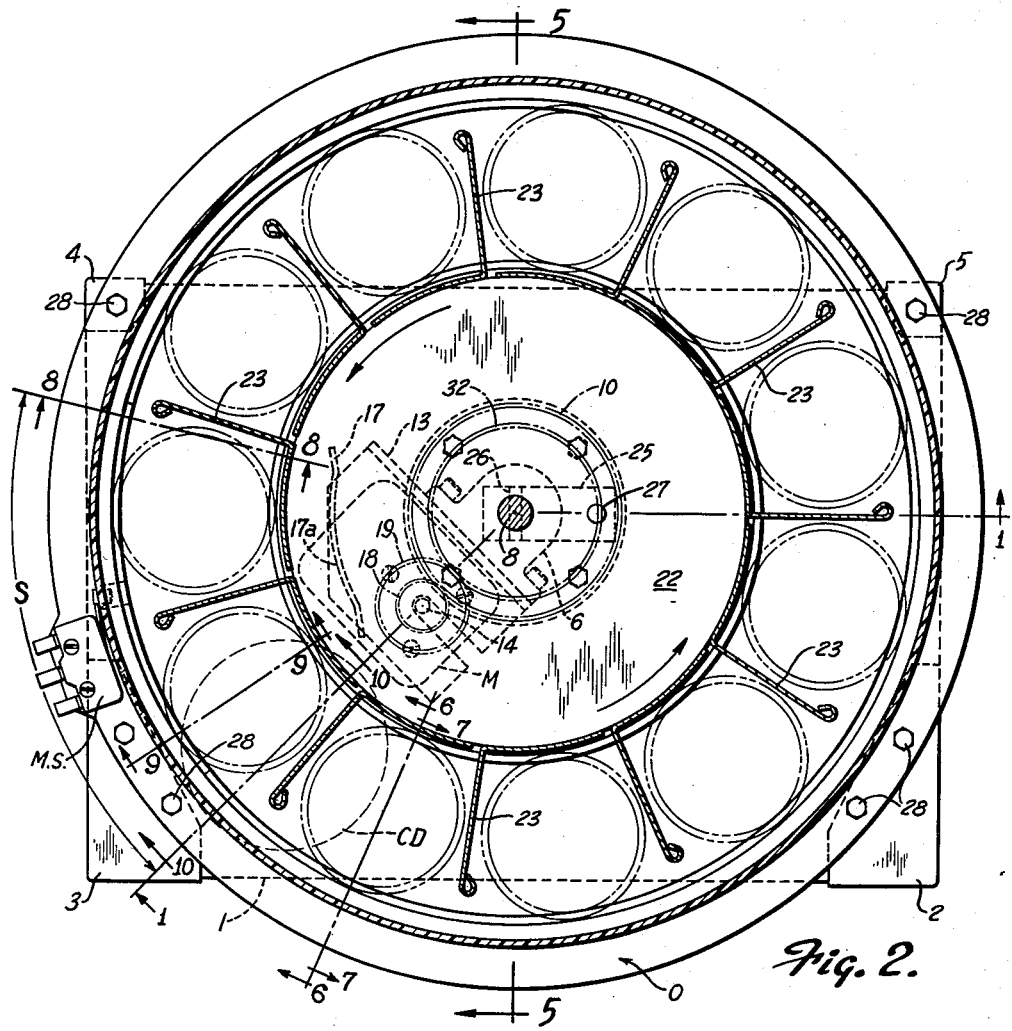
FIGURE 2 is a horizontal, sectional view taken generally along line 2—2 in FIGURE 1.

The inner ring flights, except for their horizontal, initial surface, are inclined and act in cooperation with the inclined portion 29g of the outer gear thread 29 to gradually lower and separate a cup from the rest of the stack during the arcuate travel of such stack as indicated by the letter S in FIGURE 2.

Cam actuated means are carried by the inner ring for yieldingly supporting the stacks of cups and for permitting the stacks of cups to be successively lowered and a cup therein to come to rest on the horizontal initial portion of the inner ring.

Four arms 40 are pivotally secured on the top surface of ring I by rivets 41 and can swing from a cup supporting position shown by the full lines in FIGURE 3 where their curved edges 40a coincide and are in alignment with the outer side of the threads, to a radially inward position to which they are urged when their cam follower 44 engages cam 17. More specifically, a cam follower or roller 44 is fixed to each of the arms by its sleeve 45 which is threadably engaged by the bolt 46. The bolt and sleeve extend through an aperture 47 in the ring, and the top of the sleeve is drawn up tightly against the underside of its respective arm 40. A lock nut 48 holds the sleeve rigidly on the arm 40, and a pair of extension springs 50 in attempting to move to their normally straight position gently urge the pairs of the arms apart, that is, until the sleeves 45 abut against their respective apertures 47, in which position the arms are in the cup engaging position.

When in the cup supporting position shown in FIGURE 3, the curved edges 40a of the arms are of sufficient arcuate length so as to extend across or bridge the space B between the horizontal surfaces of the inner ring threads.

*General*

The cup discharge position is indicated by the dotted circle CD in FIGURE 2, and the inclined or helix portions of the thread 29 are located immediately before this discharge station, in respect to the direction of rotation of the cups past the outer ring O. It will also be noted that the arm operating cam 17 is located immediately preceding the discharge station. When an arm 40 is shifted radially inwardly, the stack then above it is permitted to be lowered as will appear.

Referring now to FIGURES 6 to 10, the progressive positions of a cup will be described from the time it enters the loading position shown in FIGURE 6 until it reaches the cup-drop position shown in FIGURE 10.

FIGURE 6 shows the loading position when a cup from a stack is supported by the level portion 29c of the outer ring thread 29 and the arm 40 of the inner ring. This loading position is also indicated in FIGURE 2 and is located just after the cup-drop station CD in respect to the direction of inner ring rotation as indicated by the curvilinear arrow.

From the FIGURE 6 location, the cup 50 then makes almost one revolution between the gears, being supported by thread portion 29c and the arms 40, until it reaches the point 29h on the outer gear. At this time, the cam 17 actuates the arm 40 then located in that area and permits the cup 50 to descend along and be supported by portion 29f. The other side of cup 50 is at that time unsupported by the inner ring threads but is nevertheless prevented from tipping because it is nested with the cup 51 above it. Thus, after one complete revolution, cup 50 again reaches the loading position but has been lowered to be supported on the second horizontal portion 29d of the outer ring, as shown in FIGURE 7.

Thus, by referring to FIGURE 7, it will be noted that cup 51 has now assumed the position previously occupied by cup 50 and is supported on portion 29c of the outer thread and the swingable arm 40 of the inner ring.

From the FIGURE 7 position, cup 50 and its associated stack continue their rotation for approximately 270 degrees until they reach the position shown by FIGURE 8. At this position, the arm 40 has just opened and again permits the stack of cups to be lowered; more specifically, cup 51 is permitted to pass downwardly past arm 40, and cup 50 proceeds to descend downwardly along the inclined portion 29g of the outer ring thread.

As the cup 50 moves downwardly along portion 29g, it is also being separated from the rest of the stack by the action of one of the inclined threads, such as 36 of the inner ring. In other words, the inclined thread of the inner ring acts through the path of arcuate movement indicated by the reference S in FIGURE 2 and in cooperation with the inclined portion 29g of the outer thread, to thereby forcibly lower or separate the cup 50 from the rest of the stack.

Thus, during the portion of arcuate travel indicated by the letter S in FIGURE 2, the lowest cup 50 is gradually separated from the stack due to the combined action of the inclined thread of the inner ring and the inclined portion 29g of the outer ring thread.

FIGURE 9 shows the position of the cup 50 after it has been substantially separated from the rest of the stack and just before it reaches the drop position shown in FIGURE 10. Upon reaching the position shown in FIGURE 10, the cup is no longer held by the succeeding cup either due to friction or vacuum and is completely free to drop.

It will be noted that the new cup 52 then occupies the position formerly occupied by cup 50 when the latter was in the position as shown in FIGURE 6.

A micro switch MS is secured to the outer ring and functions to start and stop the motor and consequently operation of the mechanism. This switch extends through the ring, as shown in FIGURE 5, and is contacted by the rim of a cup as the latter travels through the last phase of movement between the gears. The arrangement is to turn the mechanism on and off for each cup dispensed.

*Recapitulation*

The turret is driven at a different speed than the inner ring and acts primarily to properly position the stacks of cups in respect to the threads of the gears. After the machine is in operation for awhile, the turret may occasionally and momentarily function to shift or keep the stacks properly orientated.

The cups are driven by rotation of the inner ring and the co-action or rolling contact with both gears. The cups are supported for travel around the annular path formed by the complementary and oppositely facing threads of the inner and outer gears. The stationary outer gear has a continuous thread of greater height at its lower portion which cooperates with an inner gear thread to separate the lowermost cup from the rest of its stack.

The inner ring has four separate but identical flights which act successively on the cups of successive stacks. The inner ring also carries means for helping to support the stacks of cups and then periodically permit the stacks of cups to be lowered into contact with the threads of the gears.

The thread of the outer gear has inclined portions which lower the cups toward the discharge position. This outer gear thread then also cooperates with an inner gear thread to separate the lowest cup from the rest of its stack.

The cups move both bodily around the annular path between the gears and with a rolling contact in respect thereto. There is no sliding or scraping action between the cup or either of the gears.

The cups used with the present invention are handled gently, and this is important to protect the rolled rim of the cup, particularly when large cups of a considerable number are stacked together.

There is no necessity for additional height in this mechanism to preliminarily separate a cup or group of cups from others in the mechanism and before it is possible to dispense an individual cup. By means of the present invention, a cup dispensing mechanism has been provided which has a considerable storage capacity, yet is of compact design.

Various modes of carrying out the invention are contemplated as being within the scope of the following claims particularly pointing out and distinctly claiming the subject matter which is regarded as the invention:

1. Cup dispensing mechanism for individually dispensing cups having an exterior rim, said mechanism comprising an outer stationary ring having an internal thread, a rotatable smaller inner ring mounted concentrically in said outer ring and having an external thread spaced radially from said internal thread to thereby provide an annular path between said rings, means for initially spacing stacks of cups directly above said path, and means for permitting said stacks to be lowered one at a time and one cup thereof to be engaged with said threads for support thereby, and means for rotating said inner ring to thereby cause the cups so engaged to be in rolling contact with said threads for bodily rotation around said path for subsequent discharge therefrom.

2. Cup dispensing mechanism for individually dispensing cups having an exterior rim, said mechanism comprising, an outer stationary ring having an internal thread, a rotatable smaller inner ring mounted concentrically in said outer ring and having an external thread spaced radially from said internal thread to thereby provide an annular path between said rings, a rotatable turret for containing stacks of cups directly above said path, and a plurality of arms each shiftably mounted on said inner ring for movement between a stack supporting position where it is engageable with a cup in one of said stacks for supporting the stack, and another position away from said cup to permit said stack to be lowered and said cup to come into engagement with said threads, means for rotating said inner ring to thereby cause said cup to be moved around said path in rolling contact with said thread and thereby lowered for subsequent discharge from between the rings.

3. Cup dispensing mechanism for individually dispensing cups having an exterior rim, said mechanism comprising, an outer stationary ring having an internal thread, a rotatable smaller inner ring mounted concentrically in said outer ring and having an external thread spaced radially from said internal thread to thereby provide an annular path between said rings, means for spacing stacks of cups directly above said path, means for permitting one stack at a time to be lowered and said threads to be engaged between rims of a pair of adjacent cups for support thereof and rolling contact therewith, and means for rotating said inner ring to cause the cups to be rotated bodily around said path and lowered toward a discharge position, one of said threads being of greater height than the normal distance between said rims to thereby cause separation therebetween.

4. Cup dispensing mechanism for individually dispensing cups having an exterior rim, said mechanism comprising an outer stationary ring having a single internal thread, a rotatable smaller inner ring mounted concentrically in said outer ring and having a plurality of external and individual but identical threads to thereby define an annular path between said rings, means for initially spacing stacks of cups directly above said path, and a plurality of arms each mounted on said inner ring, one arm being provided for each of said threads on said inner ring, said arms being shiftable for movement between a stack supporting position where it is engageable with a cup in one of said stacks, and another position away from said cup to permit said stack to be lowered and said cup to be in rolling contact with and supported by said threads, means for rotating said inner ring to thereby cause the engaged cups to be moved around said path and also lowered for subsequent discharge therefrom.

5. Cup dispensing mechanism for individually dispensing cups having an exterior rim, said mechanism comprising an outer stationary ring having a single internal thread, said thread having a portion of greater height than the normal spacing between the rims of adjacent cups, a rotatable smaller inner ring mounted concentrically in said outer ring and having a plurality of external and individual but identical threads to thereby define an annular path between said rings, means for initially spacing stacks of cups directly above said path, and a plurality of arms each mounted on said inner ring, one arm being provided for each of said threads on said inner ring and being shiftable for movement between a stack supporting position where it is located beneath a cup in one of said stacks for support thereof, and another position away from said cup to permit said stack to be lowered and said cup to be in rolling contact with and supported by the thread on said outer ring and one of the threads on said inner ring, means for rotating said inner ring to cause said cup to be moved around said path and thereby separated from its stack by the thread of said outer ring and simultaneously lowered for subsequent discharge from between said rings.

6. Cup dispensing mechanism for individually dispensing cups having an exterior rim, said mechanism comprising an outer stationary ring having a single internal thread, and a rotatable smaller inner ring mounted concentrically in said outer ring to thereby provide an annular path between said rings, said inner ring having a plurality of external and separate threads which act successively with said single thread to feed cups around and downwardly in said path as said inner ring is rotated.

7. Cup dispensing mechanism for individually dispensing cups having an exterior rim, said mechanism comprising, an outer stationary ring having an internal thread, a rotatable smaller inner ring mounted concentrically in said outer ring to thereby provide an annular path between said rings, said inner ring having a plurality of external and separate threads which act successively with said internal thread to feed cups around and downwardly in said path as said inner ring is rotated, and means carried by said inner ring for permitting cups to be lowered and said threads to be engaged between rims of a pair of adjacent cups for support thereof and rolling contact therewith.

8. Cup dispensing mechanism for individually dispensing cups having an exterior rim, said mechanism comprising, an outer stationary ring having an internal thread, a rotatable smaller inner ring mounted concentrically in said outer ring to thereby provide an annular path between said rings, said inner ring having a plurality of external and separate threads which act successively with said internal thread to feed cups around and downwardly in said path as said inner ring is rotated, and means carried by said inner ring for permitting a stack of cups to be lowered and said threads to be engaged between rims of a pair of adjacent cups for support thereof and rolling contact therewith, said internal thread being of greater height than the normal distance between said rims to thereby cooperate with a thread on the inner ring to cause a lowermost cup to be forcibly separated from the rest of said stack as it is fed downwardly between said rings.

References Cited in the file of this patent

UNITED STATES PATENTS

| | | |
|---|---|---|
| 2,556,852 | Pickering | June 12, 1951 |
| 3,000,408 | Vischer | Sept. 19, 1961 |